(12) United States Patent
Ebisawa (10) Patent No.: US 9,440,438 B2
(45) Date of Patent: Sep. 13, 2016

(54) INKJET PRINTER

(71) Applicant: RISO KAGAKU CORPORATION, Tokyo (JP)

(72) Inventor: Takashi Ebisawa, Ibaraki (JP)

(73) Assignee: RISO KAGAKU CORPORATION, Tokyo (JP)

( * ) Notice: Subject to any disclaimer, the term of this patent is extended or adjusted under 35 U.S.C. 154(b) by 0 days.

(21) Appl. No.: 14/477,910

(22) Filed: Sep. 5, 2014

(65) Prior Publication Data

US 2015/0077452 A1 Mar. 19, 2015

(30) Foreign Application Priority Data

Sep. 18, 2013 (JP) ................................. 2013-193050

(51) Int. Cl.
| | |
|---|---|
| B41J 29/38 | (2006.01) |
| B41J 2/12 | (2006.01) |
| B41J 2/21 | (2006.01) |
| H04N 1/50 | (2006.01) |

(52) U.S. Cl.
CPC ................ B41J 2/12 (2013.01); B41J 2/2114 (2013.01); B41J 2/2132 (2013.01); B41J 2/2135 (2013.01); B41J 2/2146 (2013.01); H04N 1/506 (2013.01)

(58) Field of Classification Search
CPC ..................................................... B41J 2/2114
See application file for complete search history.

(56) References Cited

U.S. PATENT DOCUMENTS

| | | | |
|---|---|---|---|
| 5,469,267 A * | 11/1995 | Wang | 358/3.21 |
| 2002/0030709 A1* | 3/2002 | Iwasaki | B41J 2/04505 347/19 |
| 2004/0012649 A1* | 1/2004 | Eguchi et al. | 347/20 |
| 2005/0001878 A1* | 1/2005 | Yamasaki et al. | 347/43 |
| 2006/0197802 A1* | 9/2006 | Konno | B41J 2/2114 347/43 |
| 2010/0039466 A1* | 2/2010 | Takahashi et al. | 347/12 |
| 2010/0079527 A1* | 4/2010 | Sanada | B41J 2/2132 347/14 |

FOREIGN PATENT DOCUMENTS

JP 2009-286139 A 12/2009

* cited by examiner

*Primary Examiner* — Shelby Fidler
*Assistant Examiner* — Tracey McMillion
(74) *Attorney, Agent, or Firm* — Greenblum & Bernstein, P.L.C.

(57) ABSTRACT

The controller is configured to: drive a color ink ejection head and a functional ink ejection head to print test images on a sheet in a plurality of types of test patterns between which a positional relationship of a dot of a color ink and a dot of a functional ink to be formed on the sheet is varied; determine an overlapping degree of the dot of the color ink and the dot of the functional ink in the respective printed test images on a basis of a color attribute of the respective printed test images; and control the functional ink ejection head in printing on a basis of a control content corresponding to at least one test pattern selected of the plurality of types of the test patterns on a basis of the determined overlapping degrees.

5 Claims, 11 Drawing Sheets

INKJET PRINTER

CROSS REFERENCE TO RELATED APPLICATION

This application is based upon and claims the benefit of priority from the prior Japanese Patent Application No. 2013-193050, filed on Sep. 18, 2013, the entire contents of which are incorporated herein by reference.

BACKGROUND

1. Technical Field

The disclosure relates to an inkjet printer configured to perform printing by ejecting inks from inkjet heads to a print medium.

2. Related Art

There is a line inkjet printer which performs printing by ejecting inks from a fixed inkjet head to a sheet while transferring the sheet.

In a line inkjet printer capable of performing color printing by using multiple color inks, multiple inkjet heads configured to eject the respective color inks are arranged at intervals along a sheet transfer direction (sub-scanning direction). In color printing, the inkjet heads are driven such that the color inks ejected from the nozzles of the inkjet heads land on a transferred sheet to overlap one another for each pixel.

In the line inkjet printer, attachment positions of the inkjet heads may be misaligned from originally-designed positions. This misalignment causes deterioration in print quality.

In view of this, measures are taken to reduce the deterioration in print quality due to misalignment of the inkjet heads. Specifically, the measure for misalignment in a sub-scanning direction involves adjusting an ink ejection timing for each of the inkjet heads. Meanwhile, the measure for misalignment in a main scanning direction involves selecting nozzles for the same pixel in each of the inkjet heads so as to minimize misalignment of the nozzles for the same pixel in the main scanning direction.

A positional relationship among the inkjet heads (nozzles) needs to be obtained to take measures like those described above. Procedures for obtaining the positional relationship are as follows.

First, a predetermined pattern image is printed by using the inkjet heads. In this pattern image, dots of each of the color inks are formed in a predetermined pattern. After the printing, the printed image of the pattern image is scanned with a scanner and image data is generated. Then, the positions of the dots of each color are calculated by analyzing the image data. The positional relationship among the inkjet heads (nozzles) are thus obtained based on the positions of the dots of the colors.

An inkjet printer described in Japanese Unexamined Patent Application Publication No. 2009-286139 uses a colorless-transparent functional ink. For example, in some cases, the colorless-transparent functional ink is ejected to overlap the color inks to improve the color density and gloss of the printed sheet. Moreover, in some cases, the colorless-transparent functional ink is ejected to the sheet before the ejection of the color inks to promote fixing of the color inks. The function of such a functional ink varies depending on a formula for the functional ink.

SUMMARY

In the inkjet printer having the inkjet head configured to eject the colorless-transparent functional ink, it is difficult to obtain the positional relationship between the inkjet head configured to eject the functional ink and the other inkjet heads through the procedures described above. This is because even when a pattern image is printed, the dots of the functional ink are colorless and their positions are difficult to detect.

Accordingly, in some cases, no measures can be taken against misalignment of the inkjet head configured to eject the colorless-transparent functional ink and the functional ink may land at positions greatly misaligned from the color inks. In this case, an effect of the functional ink may be reduced.

An object of the present invention is to provide an inkjet printer capable of suppressing reduction of an effect of a functional ink.

An inkjet printer in accordance with some embodiments includes: a color ink ejection head including a color ink nozzle array having a plurality of nozzles arranged at a pitch along a main scanning direction and configured to eject a color ink to a sheet transferred in a sub-scanning direction orthogonal to the main scanning direction; a functional ink ejection head including a functional ink nozzle array having a plurality of nozzles arranged at the pitch along the main scanning direction and configured to eject a colorless-transparent functional ink to the sheet transferred in the sub-scanning direction; and a controller configured to control the color ink ejection head and the functional ink ejection head. The controller is configured to: drive the color ink ejection head and the functional ink ejection head to print test images on the sheet in a plurality of types of test patterns between which a positional relationship of a dot of the color ink and a dot of the functional ink to be formed on the sheet is varied; determine an overlapping degree of the dot of the color ink and the dot of the functional ink in the respective printed test images on a basis of a color attribute of the respective printed test images; select at least one test pattern of the plurality of types of the test patterns on a basis of the determined overlapping degrees; and control the functional ink ejection head in printing on a basis of a control content corresponding to the at least one test pattern as selected.

According to the configuration described above, it is possible to suppress reduction of an overlapping area of the dot of the color ink and the dot of the functional ink due to misalignment of the inkjet heads. As a result, reduction of an effect of the functional ink can be suppressed.

The color ink ejection head may include a plurality of color ink head modules arranged along the main scanning direction and each including the color ink nozzle array. The functional ink ejection head may include a plurality of functional ink head modules arranged along the main scanning direction and each including the functional ink nozzle array. Head module arrays may be each formed of one of the plurality of color ink head modules and one of the plurality of functional ink head modules arranged in a row along the sub-scanning direction. The controller may be configured to: determine, for the respective head module arrays, the overlapping degree on a basis of the color attribute of the respective printed test images in a region corresponding to the respective head module arrays; select at least one test pattern of the plurality of types of test patterns on a basis of the determined overlapping degrees, for the respective head module arrays; and control the functional ink ejection head in printing on a basis of a control content corresponding to the test patterns as selected, for the respective head module arrays.

According to the configuration described above, it is possible to perform control according to misalignment of each of the head modules in the inkjet printer in which the inkjet heads each include the plurality of head modules.

The test patterns may include: a plurality of types of test patterns for the sub-scanning direction between which the positional relationship is varied in the sub-scanning direction; and two types of test patterns for the main scanning direction between which the positional relationship is varied with a shift by the pitch in the main scanning direction. The controller may be configured to: select one test pattern of the plurality of types of test patterns for the sub-scanning direction on a basis of the determined overlapping degrees in the test images of the plurality of types of test patterns for the sub-scanning direction; select one test pattern of the two types of test patterns for the main scanning direction on a basis of the determined overlapping degrees in the test images of the two types of test patterns for the main scanning direction; and control the functional ink ejection head in printing on a basis of a control content corresponding to the test patterns as selected.

According to the configuration described above, the controller uses the test patterns for the sub-scanning direction and the test patterns for the main scanning direction. This enables appropriate control in the sub-scanning direction and the main scanning direction even when the positions of the inkjet heads are misaligned in the sub-scanning direction and the main scanning direction.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Description will be hereinbelow provided for an embodiment of the present invention by referring to the drawings. It should be noted that the same or similar parts and components throughout the drawings will be denoted by the same or similar reference signs, and that descriptions for such parts and components will be omitted or simplified. In addition, it should be noted that the drawings are schematic and therefore different from the actual ones.

Figure 1:
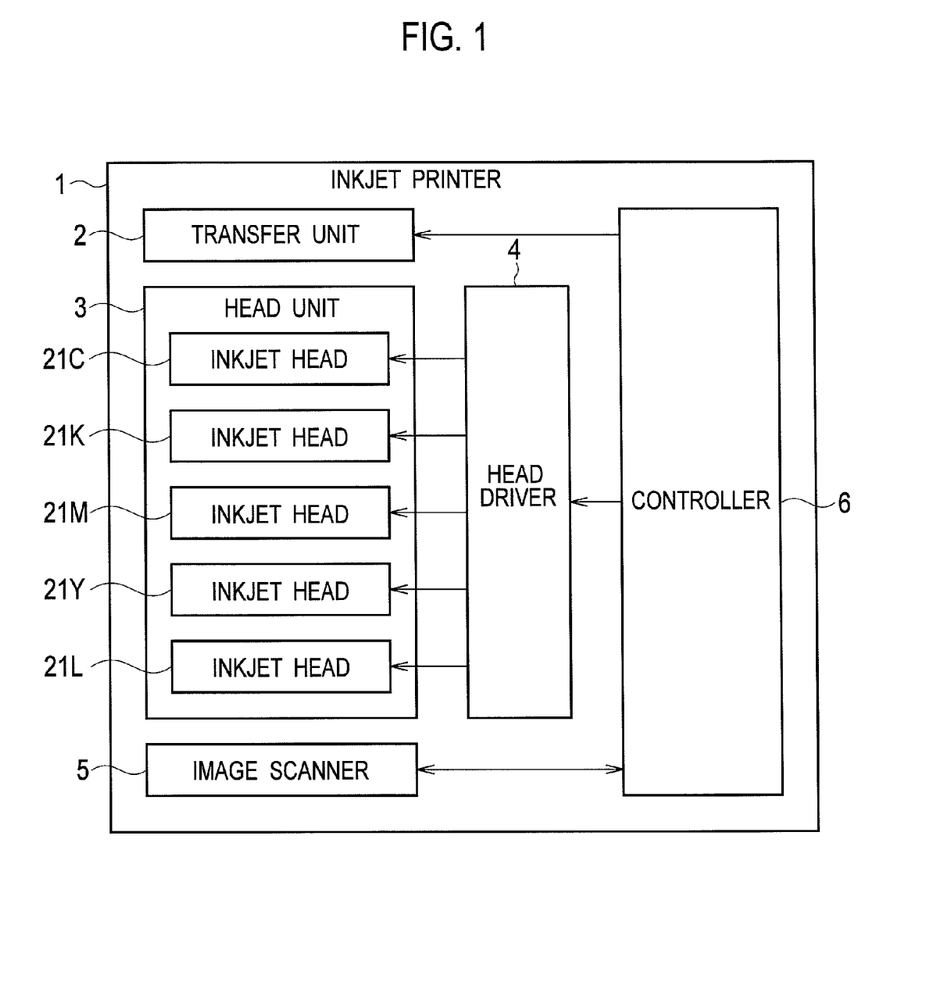
FIG. 1 is a block diagram showing a configuration of an inkjet printer in an embodiment.
Figure 2:
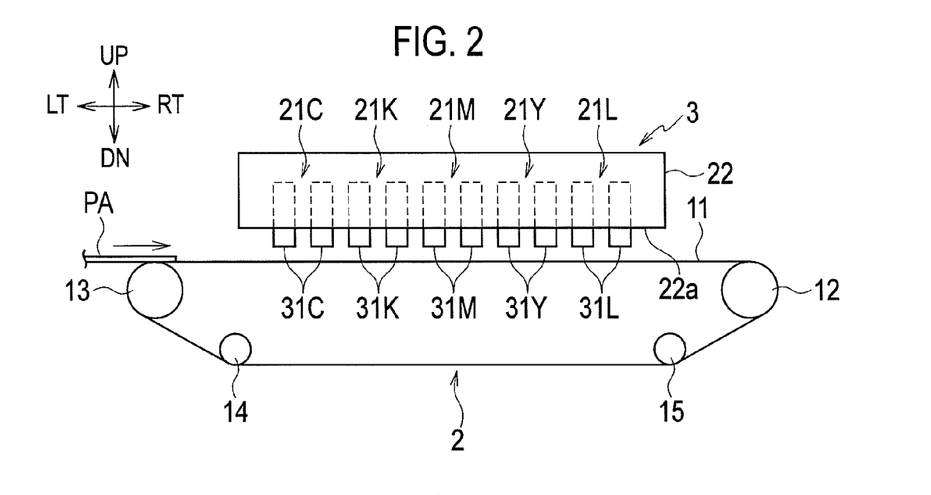
FIG. 2 is a schematic configuration diagram of a transfer unit and a head unit.
Figure 3:
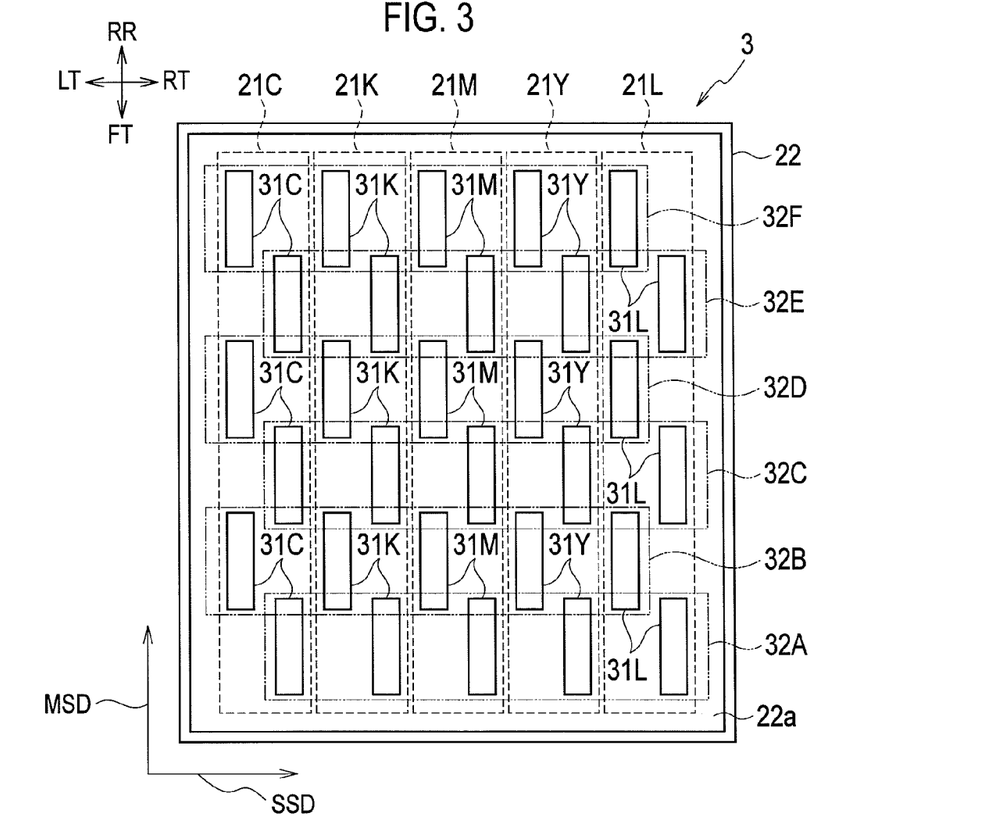
FIG. 3 is a plan view of the head unit.
Figure 4:
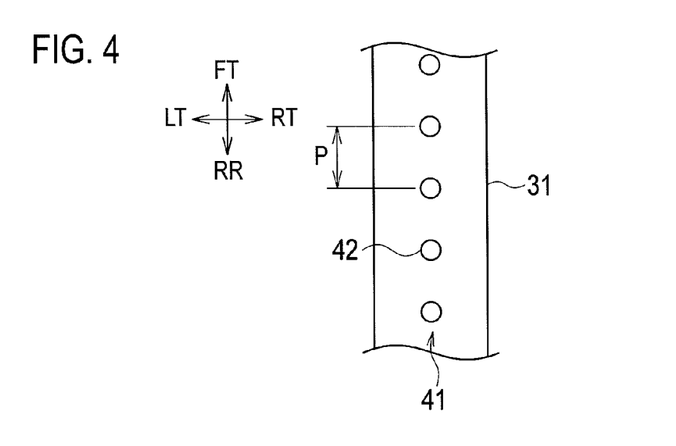
FIG. 4 is a schematic configuration diagram of a head module.

FIG. 1 is a block diagram showing a configuration of an inkjet printer in an embodiment of the present invention. FIG. 2 is a schematic configuration diagram of a transfer unit and a head unit of the inkjet printer shown in FIG. 1. FIG. 3 is a plan view of the head unit. FIG. 4 is a schematic configuration diagram of a head module.

In the following description, a direction orthogonal to a sheet surface of FIG. 2 is assumed to be a front-rear direction (main scanning direction) and a direction toward the front of the sheet surface is assumed to be a frontward direction. Moreover, up, down, left, and right in the sheet surface of FIG. 2 are assumed to be upward, downward, leftward, and rightward directions, respectively. In FIG. 2, a direction from left to right is a transfer direction (sub-scanning direction) of a sheet PA which is a print medium. In the following description, upstream and downstream mean upstream and downstream in the transfer direction. In the drawings, the rightward direction, the leftward direction, the upward direction, the downward direction, the frontward direction, and the rearward direction are denoted by RT, LT, UP, DN, FT, and RR, respectively. Moreover, in the drawings, the transfer direction (sub-scanning direction) of the sheet PA and the front-rear direction (main scanning direction) are denoted by SSD and MSD, respectively.

As shown in FIG. 1, an inkjet printer 1 of the embodiment includes a transfer unit 2, a head unit 3, a head driver 4, an image scanner 5, and a controller 6.

The transfer unit 2 transfers the sheet PA. As shown in FIG. 2, the transfer unit 2 includes a transfer belt 11, a drive roller 12, and driven rollers 13, 14, 15.

The transfer belt 11 transfers the sheet PA while sucking and holding the sheet PA. The transfer belt 11 is an annular belt wound around the drive roller 12 and the driven rollers 13 to 15. Many belt holes for sucking and holding the sheet PA are formed in the transfer belt 11. The transfer belt 11 sucks and holds the sheet PA on a top surface thereof by using sucking force generated at the belt holes by drive of a fan (not illustrated). The transfer belt 11 is rotated clockwise in FIG. 2 to transfer the sucked and held sheet PA rightward.

The drive roller 12 rotates the transfer belt 11. The drive roller 12 is driven by a not-illustrated motor.

The driven rollers 13 to 15 are driven by the drive roller 12 via the transfer belt 11. The driven roller 13 is disposed on the left side of the drive roller 12 at substantially the same height as the drive roller 12. The driven rollers 14, 15 are disposed below the drive roller 12 and the driven roller 13 at substantially the same height while being spaced away from each other in the left-right direction.

The head unit 3 ejects inks to the sheet PA transferred by the transfer unit 2 to print an image. The head unit 3 is disposed above the transfer unit 2. The head unit 3 includes inkjet heads 21C, 21K, 21M, 21Y, 21L and a head holder 22.

The inkjet heads 21C, 21K, 21M, 21Y, 21L eject the inks to the sheet PA transferred by the transfer unit 2. The inkjet heads 21C, 21K, 21M, 21Y (color ink ejection heads) eject color inks of cyan (C), black (K), magenta (M), and yellow (Y), respectively. The inkjet head 21L (functional ink ejection head) ejects a clear ink which is a colorless-transparent functional ink. The clear ink is applied to improve the color density and gloss of a printed sheet. In the embodiment, the clear ink is applied to overlap dots formed by the black ink. The inkjet heads 21C, 21K, 21M, 21Y, 21L are arranged in this order from the upstream side along the transfer direction (left-right direction) of the sheet PA at predetermined intervals.

The inkjet head 21C has multiple head modules 31C, the inkjet head 21K has multiple head modules 31K, the inkjet head 21M has multiple head modules 31M, the inkjet head 21Y has multiple head modules 31Y, and the inkjet head 21L has multiple head modules 31L. In the embodiment, as shown in FIG. 3, the inkjet head 21C has six head modules 31C, the inkjet head 21K has six head modules 31K, the inkjet head 21M has six head modules 31M, the inkjet head 21Y has six head modules 31Y, and the inkjet head 21L has six head modules 31L. The head modules 31C, 31K, 31M, 31Y correspond to color ink head modules. The head modules 31L correspond to functional ink head modules.

Note that the inkjet heads 21C, 21K, 21M, 21Y, 21L and the head modules 31C, 31K, 31M, 31Y, 31L are described generally in some cases by omitting the alphabet letters (C, K, M, Y, L) attached to the reference numerals.

In each of the inkjet heads 21, the six head modules 31 are arranged in a zigzag pattern along the front-rear direction (main scanning direction) orthogonal to the transfer direction (sub-scanning direction) of the sheet PA. Specifically, the six head modules 31 are arranged along the front-rear direction with the positions thereof being alternately offset in the left-right direction. Moreover, in the head unit 3, total of 30 head modules 31, six in each of the inkjet heads 21, are arranged to form six head module arrays 32A, 32B, 32C, 32D, 32E, 32F. The head module arrays 32A to 32F each include the five head modules 31C, 31K, 31M, 31Y, 31L of the same row along the transfer direction (sub-scanning direction) of the sheet PA.

Note that the head module arrays 32A to 32F are described generally in some cases by omitting the alphabet letters attached to the reference numerals.

As shown in FIG. 4, each of the head modules 31 has a nozzle array 41. The nozzle array 41 includes multiple nozzles 42 arranged at a predetermined pitch along the front-rear direction (main scanning direction). FIG. 4 is a bottom view of the head module 31. The nozzle arrays 41 of the head modules 31C, 31K, 31M, 31Y correspond to a color ink nozzle array. The nozzle array 41 of the head modules 31L correspond to a functional ink nozzle array.

The nozzles 42 eject the inks. The nozzles 42 of the head modules 31C eject the cyan ink, the nozzles 42 of the head modules 31K eject the black ink, the nozzles 42 of the head modules 31M eject the magenta ink, and the nozzles 42 of the head modules 31Y eject the yellow ink. The nozzles 42 of the head modules 31L eject the clear ink. The nozzles 42 are opened on bottom surfaces of the head modules 31. In the head modules 31, the number of droplets (droplet number) of the ink ejected from one nozzle 42 for one pixel can be changed to perform gradation printing in which density is expressed by the number of droplets.

The head holder 22 holds the head modules 31. The head holder 22 is formed in a substantially-rectangular solid shape which is hollow. The head holder 22 is disposed above the transfer unit 2. Multiple opening portions (not illustrated) to which the head modules 31 are respectively attached are formed on a bottom surface 22a of the head holder 22 at predetermined positions. The head holder 22 holds the head modules 31 with lower end portions of the head modules 31 protruding downward from the opening portions.

The head driver 4 drives the inkjet heads 21. Specifically, the head driver 4 drives the head modules 31 of the inkjet heads 21 and causes the inks to be ejected from the nozzles 42.

The image scanner 5 optically scans an image of an original and generates image data.

The controller 6 controls operations of various parts of the inkjet printer 1. The controller 6 includes a CPU, a RAM, a ROM, a hard disk drive, and the like.

The controller 6 performs clear head control content determination processing to be described later. The controller 6 controls the head modules 31L of the inkjet head 21L in printing on the basis of control contents determined in advance in the clear head control content determination processing.

Next, measures against misalignment of the head modules 31 in the inkjet printer 1 are described.

As described above, the head modules 31 are attached to the opening portions on the bottom surface 22a of the head holder 22. In this configuration, attachment positions of the head modules 31 are misaligned from originally-designed positions in some cases. This misalignment causes deterioration in print quality. In the inkjet printer 1, the positional relationship among the head modules 31C, 31K, 31M, 31Y are obtained to take measures to reduce deterioration in print quality due to misalignment. To achieve this, the inkjet printer 1 prints a pattern image.

Figure 5:
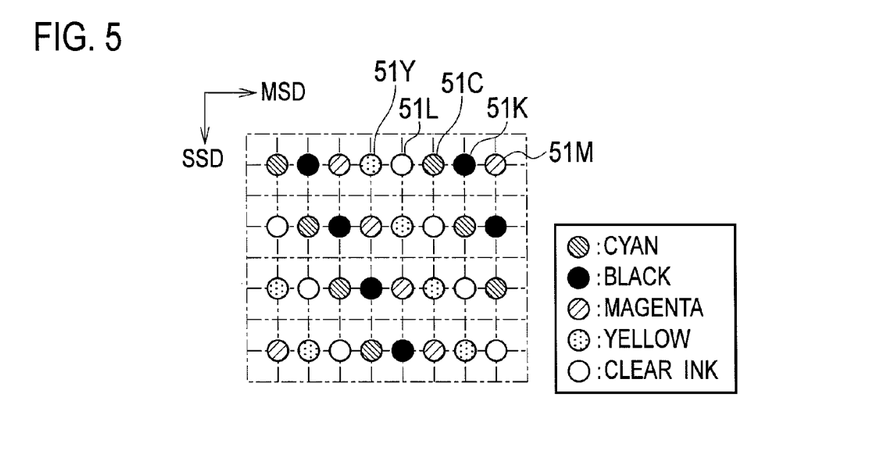
FIG. 5 is a view showing an example of a pattern image.

The pattern image printed in this case is an image in which, as shown in FIG. 5, cyan dots 51C, black dots 51K, magenta dots 51M, yellow dots 51Y, and clear dots 51L are formed at predetermined positions on the sheet PA.

Figure 6:
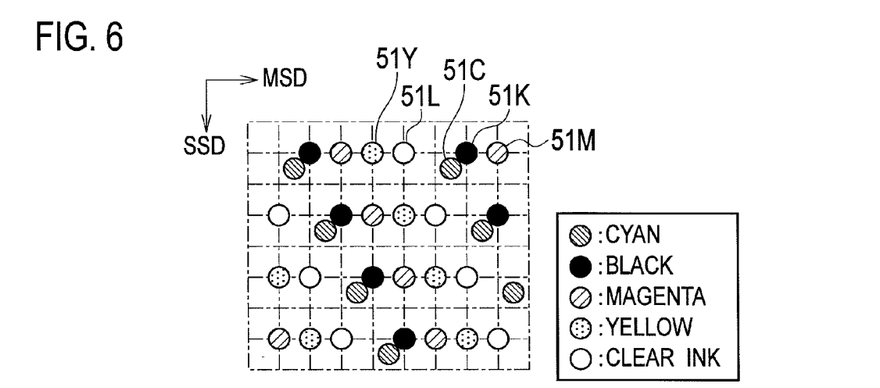
FIG. 6 is a view showing an example of the pattern image in a case where there is misalignment of the head modules.

When there is misalignment of the head modules 31, the dots 51 in the pattern image are misaligned. For example, as shown in FIG. 6, the cyan dots 51C are formed at positions misaligned from the positions of FIG. 5 where the cyan dots 51C should be formed. In the example of FIG. 6, the cyan head module 31C is misaligned in the main scanning direction and the sub-scanning direction.

After the pattern image is printed, the inkjet printer 1 scans the printed image (test image) with the image scanner 5 and generates image data. The controller 6 analyzes the image data of the printed image of the pattern image and calculates the positions of the dots 51C, 51K, 51M, 51Y of the color inks. The controller 6 obtains the positional relationship among the color head modules 31C, 31K, 31M, 31Y in the main scanning direction and the sub-scanning direction, from the positions of the dots 51C, 51K, 51M, 51Y of the color inks. The controller 6 obtains this positional relationship for each of the head module arrays 32. The controller 6 also obtains the positional relationship among the color head modules 31C, 31K, 31M, 31Y in the sub-scanning direction in the head module arrays.

Next, the controller 6 obtains an ejection timing correction amount for each of the color head modules 31C, 31K, 31M, 31Y, from the positional relationship among the head modules 31C, 31K, 31M, 31Y in the sub-scanning direction. The ejection timing correction amount is a correction amount with respect to an ejection timing in a case where there is no misalignment of the color head modules 31C, 31K, 31M, 31Y. The ejection timing correction amounts of the color head modules 31C, 31K, 31M, 31Y are obtained for each of the head module arrays 32.

Moreover, the controller 6 determines a correspondence relationship of the nozzles on the basis of the positional relationship among the color head modules 31C, 31K, 31M, 31Y in the main scanning direction. Specifically, the controller 6 determines the correspondence relationship of the nozzles 42 in the color head modules 31C, 31K, 31M, 31Y such that misalignment of the color nozzles 42 corresponding to the same pixel becomes smallest in the main scanning direction.

In printing of an original which is a print target, the controller 6 controls the inkjet heads 21C, 21K, 21M, 21Y on the basis of the ejection timing correction amounts and the correspondence relationship of the nozzles 42 which are determined as described above. This can reduce deterioration in print quality due to misalignment of the head modules 31.

In the printed images of the pattern images in FIGS. 5 and 6, the dots 51L of the clear ink is colorless. Accordingly, the positions of the dots 51L cannot be calculated from the image data of the printed images of the pattern images in FIGS. 5 and 6. Hence, processing similar to the aforementioned measures against the misalignment of the head modules 31C, 31K, 31M, 31Y cannot be used for the head modules 31L.

In view of this, the inkjet printer 1 performs the clear head control content determination processing to be described later and controls the ink head modules 31L of the inkjet head 21L on the basis of control contents determined in this processing.

Since the clear ink dots 51L are colorless and difficult to detect in the pattern images of FIGS. 5 and 6 as described above and are thus not used, a pattern image in which the dots 51L are omitted may be used instead.

Next, the aforementioned clear head control content determination processing is described with reference to the flowchart of FIG. 7.

Figure 7:
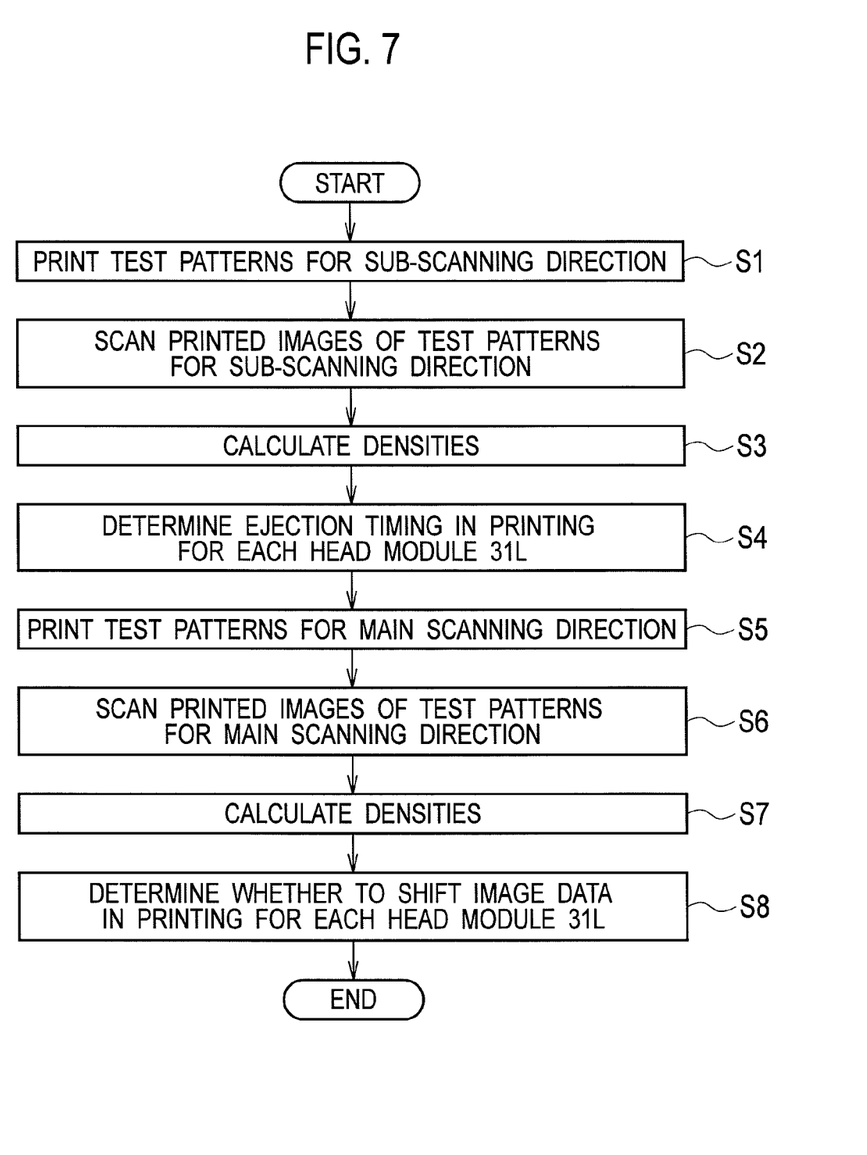
FIG. 7 is a flowchart of a clear head control content determination processing.

First, in step S1 of FIG. 7, the controller 6 prints test patterns for the sub-scanning direction.

As described above, in the embodiment, the clear ink is assumed to be applied to overlap the dots of the black ink. Test patterns used in the clear head control content determination processing are thus patterns in which the black ink and the clear ink are ejected from the head modules 31K, 31L.

Each of the test patterns for the sub-scanning direction is a pattern in which each of the inks is ejected from all the nozzles 42 in the head modules 31K or the head modules 31L to every other one of lines in a predetermined resolution. The controller 6 prints multiple types of test patterns for the sub-scanning direction among which the positional relationship of the black ink dots and the clear ink dots to be formed on the sheet PA in the sub-scanning direction is varied.

Figure 8:
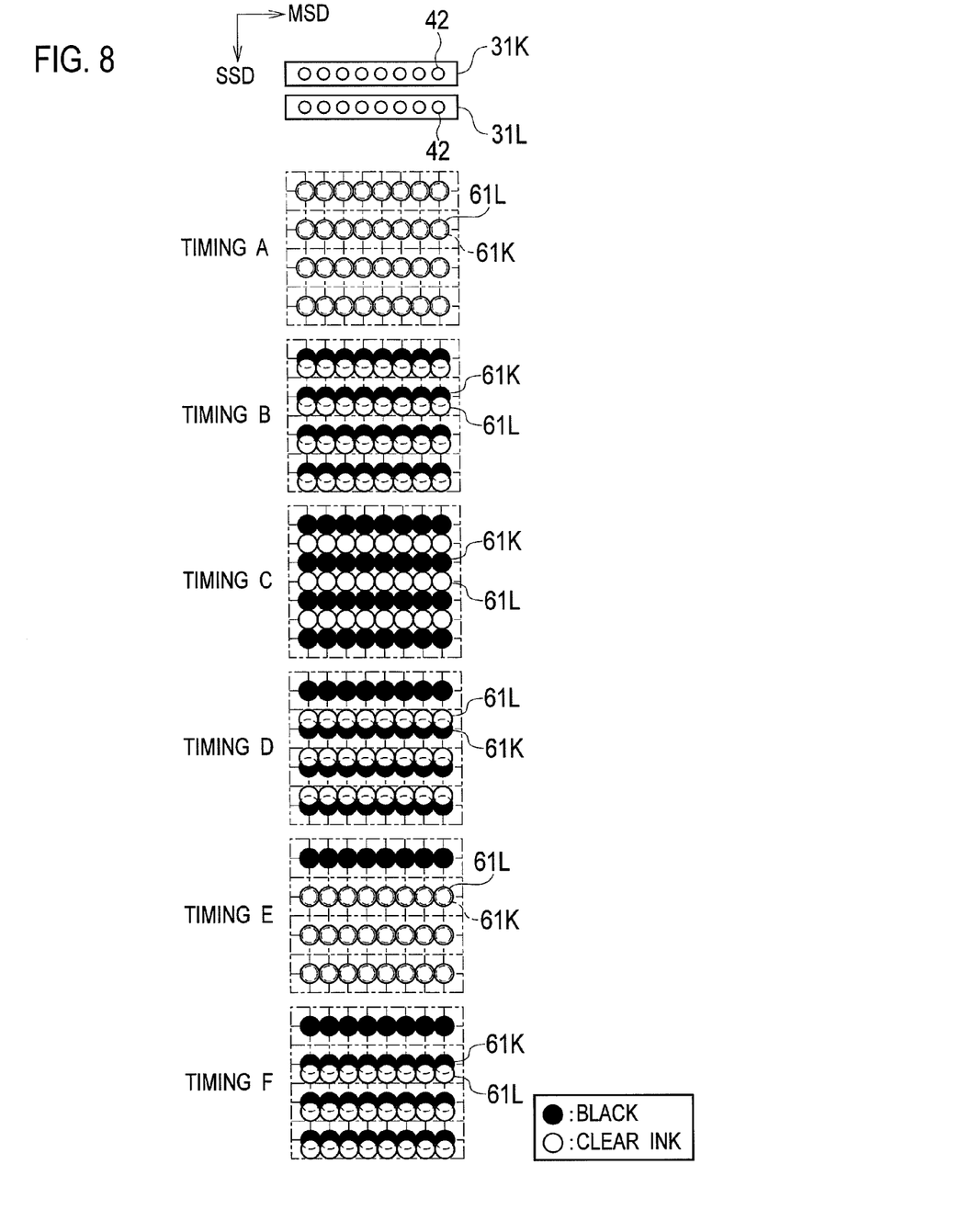
FIG. 8 is a view showing an example of printed images of test patterns for a sub-scanning direction in a case where there is no misalignment of the head modules in the sub-scanning direction.

Specifically, the controller 6 prints test patterns as shown in FIG. 8 in which the ejection timing of the clear ink for the head module 31L is set to timings A, B, C, D, E, F, respectively. In this case, the controller 6 sets the sizes of the black dots 61K and the clear ink dots 61L equal to or larger than such sizes that each two of the dots 61K, 61L adjacent in the main scanning direction abut on each other.

The timing A is a timing later than the ejection timing for the head module 31K by a time Ta corresponding to a normal distance between the head module 31K and the head module 31L in the sub-scanning direction. In other words, if there is no misalignment of the head modules 31K, 31L in the sub-scanning direction, the clear ink dots 61L ejected at the timing A is formed at the same positions as the black dots 61K.

FIG. 8 shows the test patterns for the sub-scanning direction in a case where there is no misalignment of the head modules 31K, 31L in both of the main scanning direction and the sub-scanning direction. The dots 61L thus overlap the dots 61K in the test pattern of the timing A.

The timings B to F are timings delayed from the timing A in increments of a predetermined delay time Tb. The delay time Tb is a time in which the sheet PA is transferred by a distance corresponding to half of a line in a predetermined resolution. As shown in FIG. 8, for example, a line of the dots 61L is thus formed in an intermediate position between each adjacent two lines of the dots 61K in the test pattern of the timing C.

Figure 9:
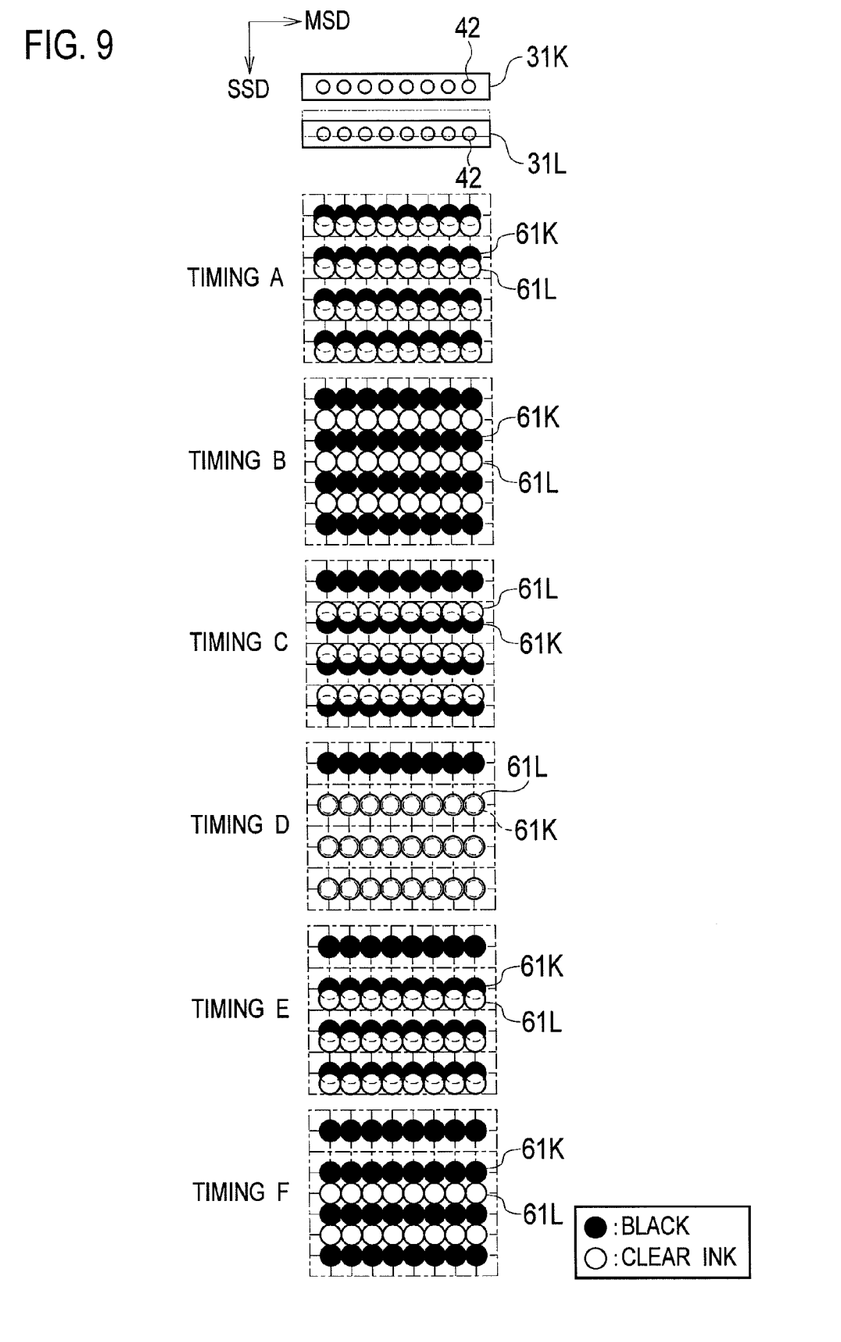
FIG. 9 is a view showing an example of printed images of the test patterns for the sub-scanning direction in a case where there is misalignment of the head modules in the sub-scanning direction.

When there is misalignment of the head modules 31K, 31L, the test patterns for the sub-scanning direction are printed as shown in FIG. 9 for example. FIG. 9 shows printed images of the test patterns for the sub-scanning direction in a case where there is such misalignment that the distance between the head modules 31K, 31L in the sub-scanning direction is longer than the normal distance.

Returning to FIG. 7, after the test patterns for the sub-scanning direction is printed, the controller 6 drives the image scanner 5 to scan the printed images of the test patterns for the sub-scanning direction in step S2. Here, the controller 6 drives the image scanner 5 to scan the printed images of the test patterns corresponding respectively to the timings A to F. The image scanner 5 scans the printed images corresponding to the timings A to F and generates image data for each of the timings A to F.

Next, in step S3, the controller 6 calculates the densities of the printed images from the image data of the printed images. In this case, the controller 6 calculates the density for each of regions of the printed images corresponding to the head modules 32A to 32F.

The clear ink in the embodiment is an ink which overlaps the black ink to change reflection of light and improve the density of the overlapping portion. Accordingly, the density of the printed image of the test pattern increases as the area in which the clear ink dots 61L overlap the black dots 61K increases. In other words, the overlapping degree of the dots 61L and the dots 61K can be determined from the density of the printed image.

Next, in step S4, the controller 6 determines the ejection timing of the clear ink in printing for each of the head modules 31L.

Specifically, for each of the head module arrays 32A to 32F, the controller 6 selects, from the test patterns corresponding respectively to the timings A to F, a test pattern in which the overlapping degree of the dots 61L and the dots 61K is the greatest in the region corresponding to the head module array 32. In other words, for each of the head module arrays 32A to 32F, the controller 6 selects a test pattern in which the density of the region corresponding to the head module array 32 is the greatest. Then, the controller 6 determines the ejection timing corresponding to the selected test pattern as the ejection timing of the clear ink for the head module 31L of this head module array 32.

Figure 10:
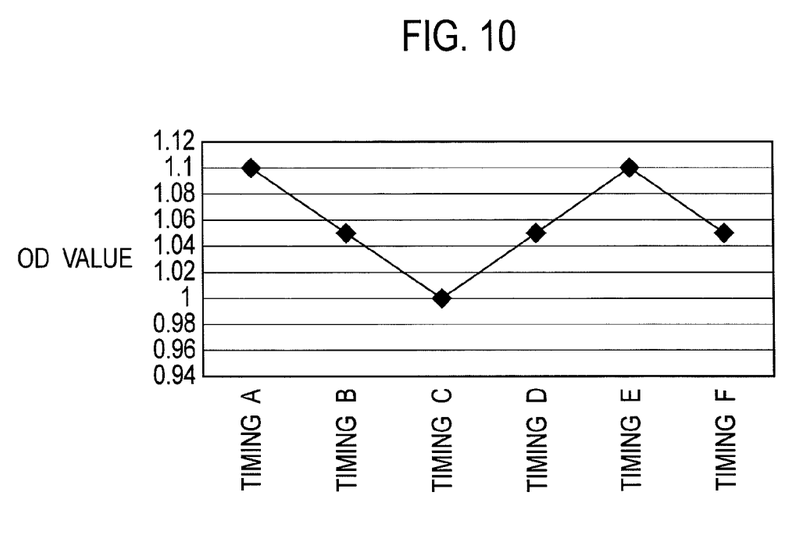
FIG. 10 is a view showing the densities of the printed images of the test patterns shown in FIG. 8.
Figure 11:
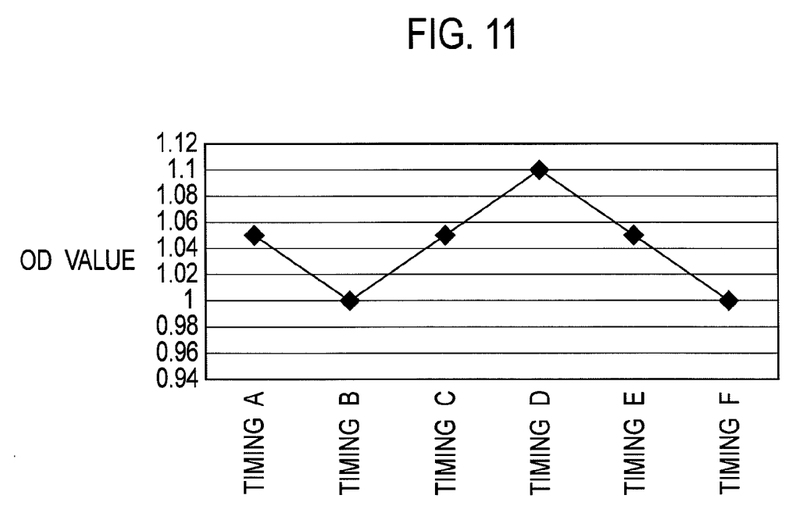
FIG. 11 is a view showing the densities of the printed images of the test patterns shown in FIG. 9.

The densities (OD values) of the printed images of the test patterns corresponding to the timings A to F in the examples of FIGS. 8 and 9 are as shown in FIGS. 10 and 11.

As shown in FIG. 10, the densities of the printed images of the test patterns of the timing A and the timing E are the greatest in the example of FIG. 8. This is because, in FIG. 8, the dots 61L land at the same positions as the dots 61K in the printed images of the test patterns of the timings A, E and completely cover the dots 61K.

Accordingly, in the example of FIG. 8, the ejection timing in printing for the head module 31L is determined to be the timing A or the timing E. Specifically, the ejection timing for the head module 31L is determined to be a timing (timing A) later than the ejection of the head module 31K by the time Ta or a timing (timing E) later than the ejection of the head module 31K by a time (Ta+4 Tb).

Meanwhile, as shown in FIG. 11, in the example of FIG. 9, the density of the printed image of the test pattern of the timing D is the greatest. This is because, in FIG. 9, the dots 61L land at the same positions as the dots 61K in the printed image of the test pattern of the timing D and almost completely cover the dots 61K.

Accordingly, in the example of FIG. 9, the ejection timing in printing for the head module 31L is determined to be the timing D. Specifically, the ejection timing for the head module 31L is determined to be a timing (timing E) later than the ejection of the head module 31K by a time (Ta+3 Tb).

Note that, although the FIGS. 8 and 9 show examples without misalignment of the head modules 31K, 31L in the main scanning direction, there may be misalignment in the main scanning direction. As described above, in the test patterns for the sub-scanning direction, the sizes of the black dots 61K and the clear ink dots 61L are set equal to or larger than such sizes that each two of the dots 61K, 61L adjacent in the main scanning direction abut on each other. In other words, the dots 61K, 61L are formed without a gap in the main scanning direction. Accordingly, even when the positional relationship between the head modules 31K, 31L in the main scanning direction changes, the tendency of the overlapping degree (density) of the dots 61L and the dots 61K in the printed images of the test patterns for the timings A to F does not change.

As described above, the test patterns for the sub-scanning direction are patterns in which the tendency of the overlapping degree of the dots 61L and the dots 61K in the printed images is not affected by misalignment of the head modules 31K, 31L in the main scanning direction.

Returning to FIG. 7, after the ejection timing of the clear ink in printing for each of the head modules 31L is determined, the controller 6 prints test patterns for the main scanning direction in step S5.

Each of the test patterns for the main scanning direction is a pattern in which each of the inks is ejected from every other nozzle 42 in the head modules 31K or the head modules 31L to all the lines. The controller 6 prints two types of test patterns for the main scanning direction between which the positional relationship of the black ink dots and the clear ink dots to be formed on the sheet PA in the main scanning direction is varied with a shift by one pitch.

Figure 12A:
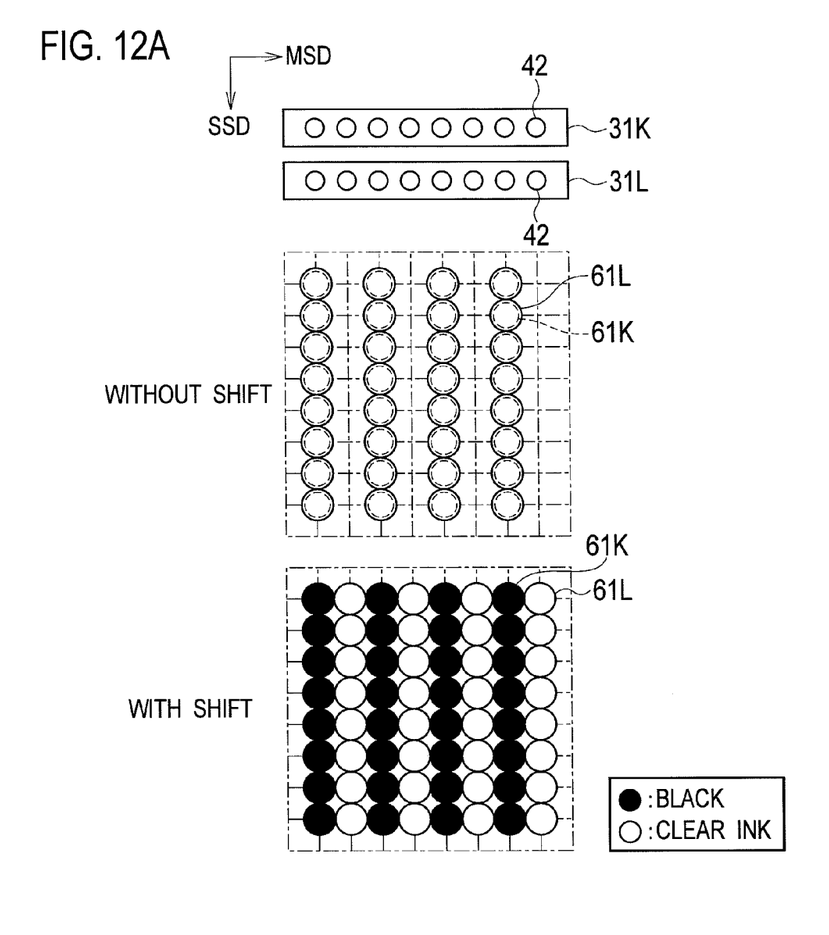
FIG. 12A is a view showing an example of printed images of test patterns for a main scanning direction in a case where there is no misalignment of the head modules in the main scanning direction.

Specifically, the controller 6 prints a test pattern with shift and a test pattern without shift like those shown in FIG. 12A. In the test pattern without shift, the inks are ejected from the nozzles 42 whose order (nozzle number) in the head modules 31K, 31L from one side in the main scanning direction is the same. In the test pattern with shift, the nozzles 42 in the head modules 31L which eject the clear ink are offset (shifted) by one nozzle 42 (by one pitch) from those in the test pattern without shift. In this case, the controller 6 sets the sizes of the black dots 61K and the clear ink dots 61L equal to or larger than such sizes that each two of the dots 61K, 61L adjacent in the sub-scanning direction abut on each other.

FIG. 12A shows the test patterns for the main scanning direction in a case where there is no misalignment of the head modules 31K, 31L in both of the main scanning direction and the sub-scanning direction. In the test pattern without shift, the dots 61L thus overlap the dots 61K. Meanwhile, in the test pattern with shift, the dots 61L are each formed in an intermediate position between the corresponding two dots 61K adjacent to each other in the main scanning direction and do not overlap the dots 61K.

Figure 13A:
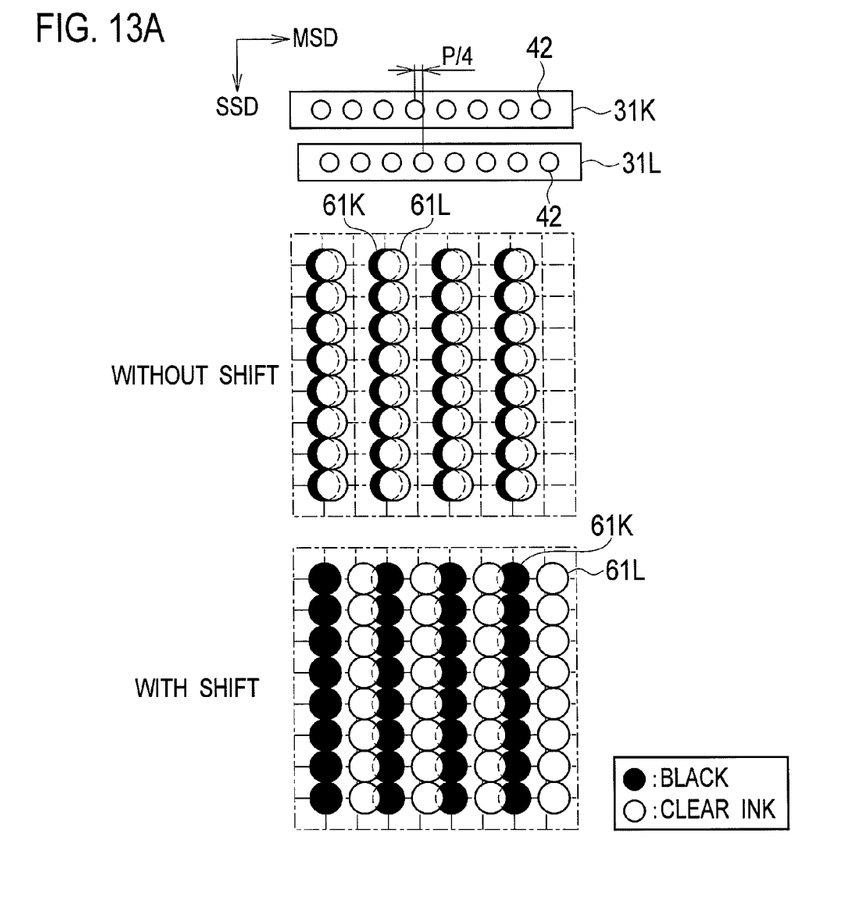
FIG. 13A is a view showing an example of printed images of the test patterns for the main scanning direction in a case where there is misalignment of the head modules in the main scanning direction.
Figure 14A:
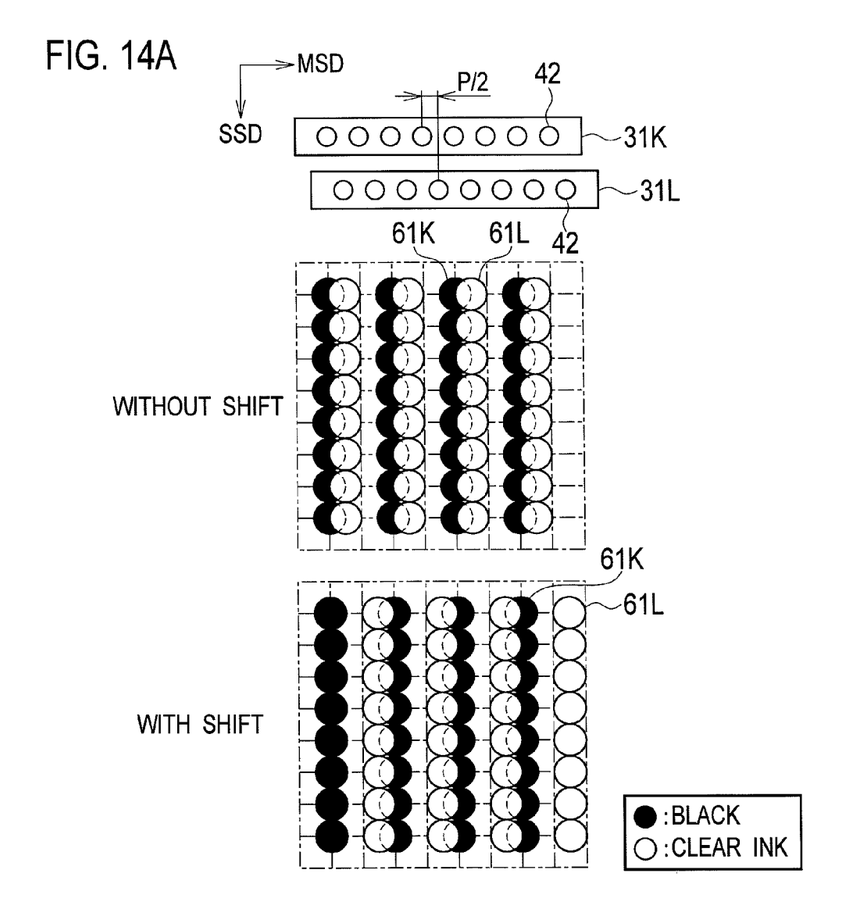
FIG. 14A is a view showing another example of the printed images of the test patterns for the main scanning direction in the case where there is misalignment of the head modules in the main scanning direction.
Figure 15A:
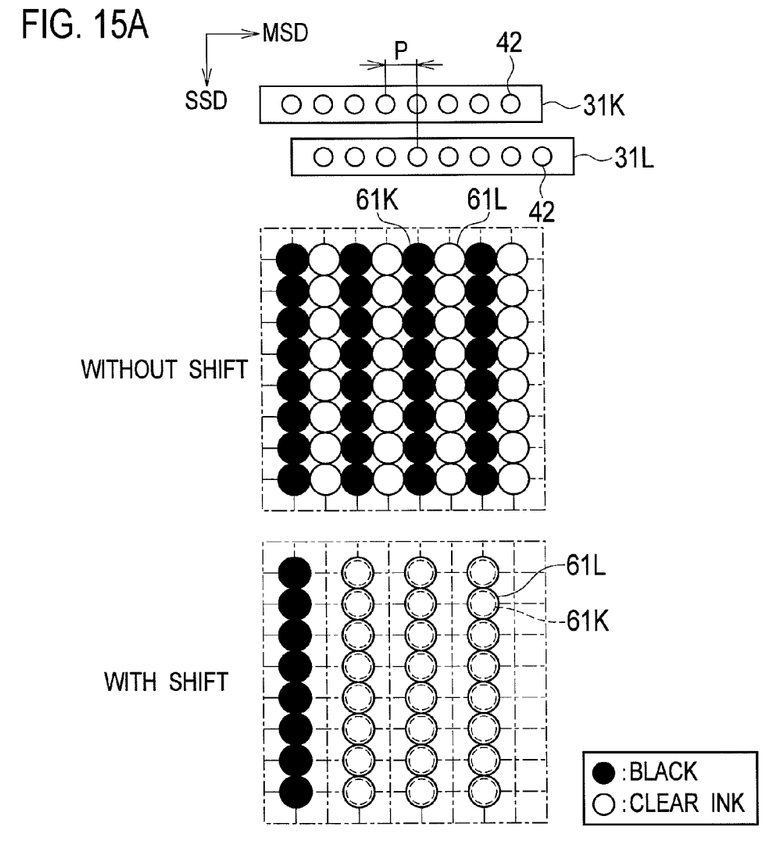
FIG. 15A is a view showing yet another example of the printed images of the test patterns for the main scanning direction in the case where there is misalignment of the head modules in the main scanning direction.

When there is misalignment of the head modules 31K, 31L in the main scanning direction, the test patterns for the main scanning direction are printed as shown in FIGS. 13A, 14A, and 15A for example. FIGS. 13A, 14A, and 15A show printed images of the test patterns for the main scanning direction in cases where the head module 31L is misaligned with respect to the head module 31K in the main scanning direction by P/4, P/2, and P.

Returning to FIG. 7, after the test patterns for the main scanning direction is printed, the controller 6 drives the image scanner 5 to scan the printed images of the test patterns for the main scanning direction in step S6. Here, the controller 6 drives the image scanner 5 to scan the printed images of the test patterns with shift and without shift. The image scanner 5 scans the printed images of the test patterns with shift and without shift and generates image data for each of the test patterns.

Next, in step S7, the controller 6 calculates the densities of the printed images from the image data of the printed images. In this case, the controller 6 calculates the density for each of regions of the printed images corresponding to the head modules 32A to 32F.

Then, in step S8, the controller 6 determines whether to shift the image data for the head modules 31L in printing or not.

Specifically, for each of the head module arrays 32A to 32F, the controller 6 selects, from the test patterns with shift and without shift, a test pattern in which the overlapping degree of the dots 61L and the dots 61K is greater in the region corresponding to the head module array 32. In other words, for each of the head module arrays 32A to 32F, the controller 6 selects a test pattern in which the density of the region corresponding to the head module array 32 is greater. When the controller 6 selects the test pattern without shift, the controller 6 determines that no shifting of the image data is to be performed for the head module 31L. Meanwhile, when the controller 6 selects the test pattern with shift, the controller 6 determines that shifting of the image data is to be performed for the head module 31L.

The densities (OD values) of the printed images of the test patterns with shift and without shift in the examples of FIGS. 12A, 13A, 14A, and 15A are as shown in FIGS. 12B, 13B, 14B, and 15B.

Figure 12B:
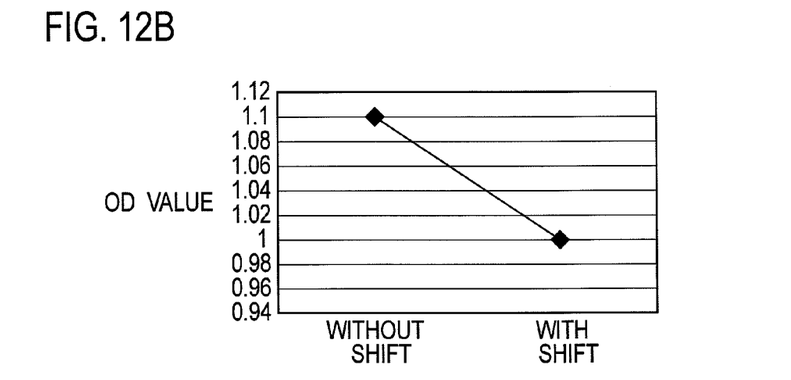
FIG. 12B is a view showing the densities of the printed images of the test patterns shown in FIG. 12A.

As shown in FIG. 12B, the density of the printed image of the test pattern without shift is greater than that of the test pattern with shift in the example of FIG. 12A. This is because, in FIG. 12A, the dots 61L completely cover the dots 61K in the printed image of the test pattern without shift while the dots 61L do not overlap the dots 61K in the printed image of the test pattern with shift. Hence, in the example of FIG. 12A, the controller 6 determines not to perform the shifting of the image data in printing for the head module 31L.

Figure 13B:
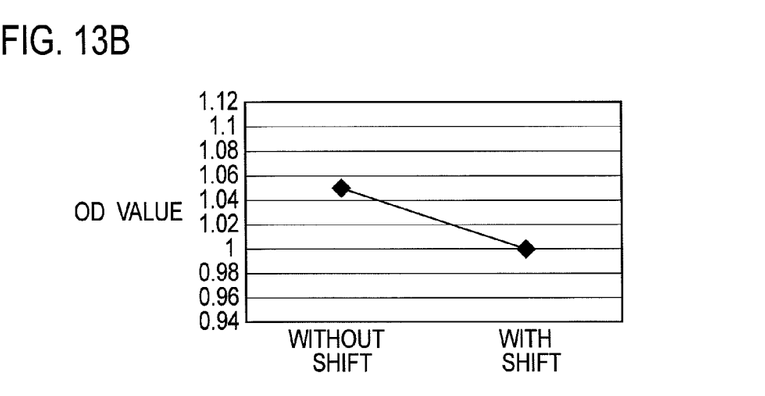
FIG. 13B is a view showing the densities of the printed images of the test patterns shown in FIG. 13A.

Moreover, as shown in FIG. 13B, the density of the printed image of the test pattern without shift is greater than that of the test pattern with shift in the example of FIG. 13A. This is because the area in which the dots 61L overlap the dots 61K in the test pattern without shift is greater than that in the test pattern with shift. Hence, in the example of FIG. 13A, the controller 6 determines not to perform the shifting of the image data in printing for the head module 31L.

Figure 14B:
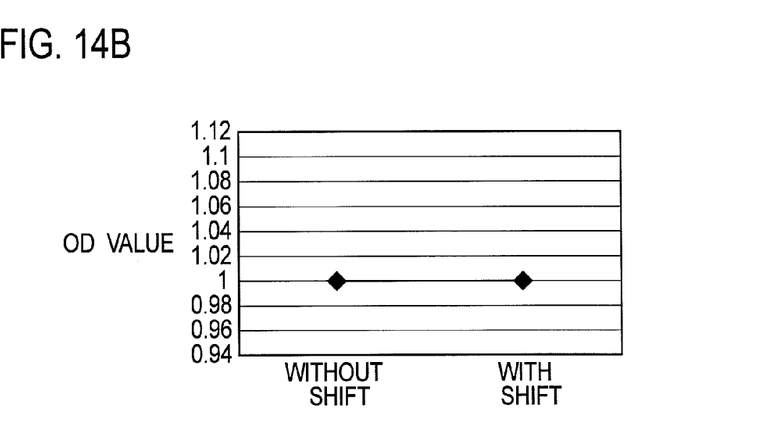
FIG. 14B is a view showing the densities of the printed images of the test patterns shown in FIG. 14A.

Furthermore, as shown in FIG. 14B, the density of the printed image of the test pattern without shift and that of the test pattern with shift is about the same in the example of FIG. 14A. This is because the area in which the dots 61L overlap the dots 61K is about the same in the test pattern without shift and the test pattern with shift. Hence, in the example of FIG. 14A, the shifting of the image data in printing may or may not be performed for the head module 31L.

Figure 15B:
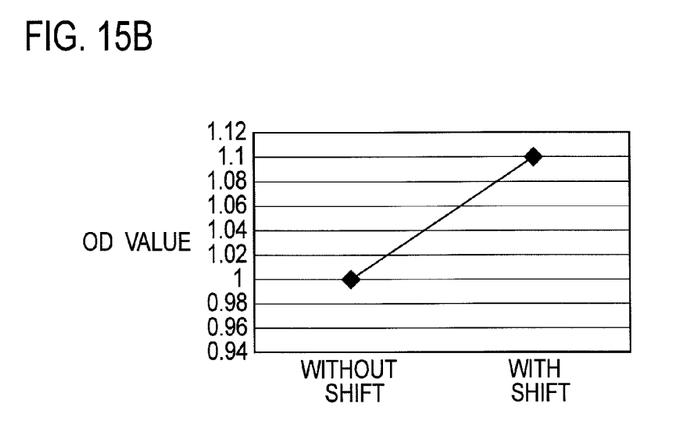
FIG. 15B is a view showing the densities of the printed images of the test patterns shown in FIG. 15A.

Moreover, as shown in FIG. 15B, the density of the printed image of the test pattern with shift is greater than that of the test pattern without shift in the example of FIG. 15A. This is because, in FIG. 15A, the dots 61L completely cover the dots 61K in the printed image of the test pattern with shift while the dots 61L do not overlap the dots 61K in the printed image of the test pattern without shift. Hence, in the example of FIG. 15A, the controller 6 determines to perform shifting of the image data in printing for the head module 31L.

Note that, although the FIGS. 12A to 15B show examples with no misalignment of the head modules 31K, 31L in the sub-scanning direction, there may be misalignment in the sub-scanning direction. As described above, in the test patterns for the main scanning direction, the sizes of the black dots 61K and the clear ink dots 61L are set equal to or larger than such sizes that each two of the dots 61K, 61L adjacent in the main scanning direction abut on each other. In other words, the dots 61K, 61L are formed without a gap in the sub-scanning direction. Accordingly, even when the positional relationship between the head modules 31K, 31L in the sub-scanning direction changes, the tendency of the overlapping degree (density) of the dots 61L and the dots 61K in the printed images of the test patterns without shift and with shift does not change.

As described above, the test patterns for the main scanning direction are patterns in which the tendency of the overlapping degree of the dots 61L and the dots 61K in the printed images is not affected by misalignment of the head modules 31K, 31L in the sub-scanning direction.

When the controller 6 determines to perform or not to perform the shifting of the image data in printing for each of the head modules 31L in step S8 of FIG. 7 described above, the controller completes the clear head control content determination processing. The controller 6 determines the ejection timing of the clear ink for each head module 31L and whether to perform the shifting of the image data or not for each head module 31L as control contents of the inkjet head 21L, through the clear head control content determination processing.

Next, a printing operation of the inkjet printer 1 is described.

When an instruction to start printing is given, the controller 6 drives and rotates the drive roller 12 of the transfer unit 2. This causes the transfer belt 11 to rotate. When the sheet PA is fed from a not-illustrated feeder, the sheet PA is transferred by the transfer unit 2. The controller 6 causes the inkjet heads 21C, 21K, 21M, 21Y, 21L to eject the inks to the sheet PA transferred by the transfer unit 2, on the basis of the image data. An image is thereby printed on the sheet PA.

In this case, the controller 6 controls each of the head modules 31L of the inkjet head 21L on the basis of the control contents determined in the clear head control content determination processing in advance.

Specifically, the controller 6 controls each of the head modules 31L such that the clear ink is ejected from the head module 31L at the ejection timing determined in the clear head control content determination processing.

Moreover, the controller 6 causes the ejection operation to be performed with the image data being shifted by one pixel in the main scanning direction in the head module 31L for which the controller 6 has determined to perform the shifting of the image data in the clear head control content determination processing. The controller 6 causes the ejection operation to be performed without the shifting of the image data in the head module 31L for which the controller 6 has determined not to perform the shifting of the image data.

As described above, in the inkjet printer 1, the controller 6 determines, for each of the head module arrays 32, the overlapping degree of the dots 61L and the dots 61K in each of the printed images of the test patterns for the sub-scanning direction and the test patterns for the main scanning direction, from the density in the region of the printed image of the test pattern corresponding to the head module 32. Then, the controller 6 determines the control contents corresponding to the test pattern selected based on the overlapping degree of the dots 61L and the dots 61K for each of the sub-scanning direction and the main scanning direction, as the control contents for the head module 31L of the head module 32. The controller 6 controls the head modules 31L in printing on the basis of the thus-determined control contents.

The inkjet printer 1 can thus suppress reduction of the overlapping area of the dots 61L and the dots 61K due to misalignment of the head modules 31L. As a result, the inkjet printer 1 can suppress reduction of an effect of the clear ink.

The inkjet printer 1 can perform appropriate control in the sub-scanning direction and the main scanning direction by using the test patterns for the sub-scanning direction and the test patterns for the main scanning direction, even when the head modules 31L are misaligned in the sub-scanning direction and the main scanning direction.

Moreover, since the controller 6 determines the control contents for each of the head modules 31L, the controller 6 can perform control according to misalignment of each of the head modules 31L in the inkjet printer 1 in which the inkjet heads 21 each include the multiple head modules 31.

Although the case where the clear ink is applied to overlap the black ink is described in the aforementioned embodiment, the present invention can be applied to a case where the clear ink is applied to overlap another color ink.

Moreover, in the aforementioned embodiment, description is given of the case of using the color ink which improves the density of the color ink by being applied to overlap the color ink. However, the clear ink of the present invention is not limited to the clear ink improving the density and a clear ink which changes any other color attribute of the color ink may be used. The color attributes of the color ink include, in addition to the density, hue, saturation, and the like. For example, a clear ink which changes the hue of the color ink may be used. In this case, the overlapping degree of the dot of the color ink and the dot of the clear ink can be determined from the hue. Hence, it is only necessary to detect the hue from the image data obtained by scanning the printed images of the test patterns.

Furthermore, in the aforementioned embodiment, description is given of the case where the clear ink applied after the application of the color ink is used as the functional ink. However, the present invention can be also applied to a case where a colorless-transparent preprocessing material is used as the functional ink, provided that the preprocessing material is one which changes the color attribute of the color ink. Examples of the preprocessing materials include a material having a function of promoting fixing of the color ink by being applied to the sheet before the application of the color ink. Note that, in this case, an inkjet head configured to eject the preprocessing material is arranged upstream of an inkjet head configured to eject the color ink.

Moreover, in the aforementioned embodiment, although the test pattern for the sub-scanning direction and the test pattern for the main scanning direction are used, either one of the test patterns may be omitted. Also in this case, the misalignment of the dots of the functional ink and the dots of the color ink in the main scanning direction or the sub-scanning direction can be reduced and the reduction of the effect of the clear ink can be suppressed. Note that the test patterns (test pattern for the sub-scanning direction and the test pattern for the main scanning direction) may be stored in a not-illustrated storage unit such as a ROM included in the inkjet printer 1 to be read by the controller 6. Alternatively, the controller 6 may receive the test patterns from an external unit.

In the embodiment described above, description is given of the case where the inkjet heads 21 each include the multiple head modules 31. However, the present invention can be applied to an inkjet printer in which an inkjet head is formed of a single member covering the entire printing width in the main scanning direction.

Embodiments of the present invention have been described above. However, the invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

Moreover, the effects described in the embodiments of the present invention are only a list of optimum effects achieved by the present invention. Hence, the effects of the present invention are not limited to those described in the embodiment of the present invention.

What is claimed is:

1. An inkjet printer comprising:
    a color ink ejection head including a color ink nozzle array having a plurality of nozzles arranged at a pitch along a main scanning direction and configured to eject a color ink to a sheet transferred in a sub-scanning direction orthogonal to the main scanning direction;
    a functional ink ejection head including a functional ink nozzle array having a plurality of nozzles arranged at the pitch along the main scanning direction and configured to eject a colorless-transparent functional ink to the sheet transferred in the sub-scanning direction; and
    a controller configured to control the color ink ejection head and the functional ink ejection head,
    wherein
        the controller is configured to
            drive the color ink ejection head and the functional ink ejection head to print test images on the sheet in a plurality of types of test patterns between which a positional relationship of a dot of the color ink and a dot of the functional ink to be formed on the sheet is varied,
            determine an overlapping degree of the dot of the color ink and the dot of the functional ink in the respective printed test images on a basis of a color attribute of the respective printed test images,
            select at least one test pattern of the plurality of types of the test patterns on a basis of the determined overlapping degrees, and
            control the functional ink ejection head to print on a basis of a control content corresponding to the at least one test pattern selected,
        the test patterns include:
            a plurality of types of test patterns for the sub-scanning direction between which the positional relationship is varied in the sub-scanning direction; and
            two types of test patterns for the main scanning direction between which the positional relationship is varied with a shift by the pitch in the main scanning direction,
        the controller is further configured to
            select one test pattern of the plurality of types of test patterns for the sub-scanning direction on a basis of the determined overlapping degrees in the test images of the plurality of types of test patterns for the sub-scanning direction,
            select one test pattern of the two types of test patterns for the main scanning direction on a basis of the determined overlapping degrees in the test images of the two types of test patterns for the main scanning direction, and
            control the functional ink ejection head to print on a basis of a control content corresponding to the test patterns selected.

2. The inkjet printer according to claim 1, wherein the controller is further configured to drive the color inkjet ejection head and the functional ink ejection head to eject the color ink and the functional ink to the sheet such that the dot of the color ink and the dot of the functional ink are overlapped on the sheet.

3. The inkjet printer according to claim 1, wherein the controller determines the overlapping degree of the dot of the color ink and the dot of the functional ink by determining a location of the dot of the functional ink with respect to a corresponding dot of the color ink.

4. The inkjet printer according to claim 1, wherein the controller is further configured to shift image data based on the determined overlapping degree.

5. The inkjet printer according to claim 1, wherein the color ink ejection head includes a plurality of color ink head modules arranged along the main scanning direction and each including the color ink nozzle array, the functional ink ejection head includes a plurality of functional ink head modules arranged along the main scanning direction and each including the functional ink nozzle array, head module arrays each comprise one of the plurality of color ink head modules and one of the plurality of functional ink head modules arranged in a row along the sub-scanning direction, and the controller is further configured to
- determine, for the respective head module arrays, the overlapping degree on a basis of the color attribute of the respective printed test images in a region corresponding to the respective head module arrays,
- select at least one test pattern of the plurality of types of test patterns on a basis of the determined overlapping degrees, for the respective head module arrays, and
- control the functional ink ejection head to print on a basis of a control content corresponding to the test patterns selected, for the respective head module arrays.

* * * * *